(12) United States Patent
Caleffi

(10) Patent No.: US 11,920,694 B2
(45) Date of Patent: Mar. 5, 2024

(54) ANTIFREEZE VALVE UNIT

(71) Applicant: Caleffi S.p.A., Fontaneto d'Agogna (IT)

(72) Inventor: Marco Caleffi, Fontaneto d'Agogna (IT)

(73) Assignee: Caleffi S.p.A. (IT)

( * ) Notice: Subject to any disclaimer, the term of this patent is extended or adjusted under 35 U.S.C. 154(b) by 0 days.

(21) Appl. No.: 17/534,595

(22) Filed: Nov. 24, 2021

(65) Prior Publication Data

US 2022/0163131 A1 May 26, 2022

(30) Foreign Application Priority Data

Nov. 26, 2020 (EP) .................................. 20210140

(51) Int. Cl.
*G05D 23/02* (2006.01)
*F16K 31/00* (2006.01)

(52) U.S. Cl.
CPC ......... *F16K 31/002* (2013.01); *G05D 23/023* (2013.01)

(58) Field of Classification Search
CPC .. F16K 31/002; G05D 23/022; G05D 23/023; E03B 7/10; E03B 7/12
See application file for complete search history.

(56) References Cited

U.S. PATENT DOCUMENTS

| | | | |
|---|---|---|---|
| 2,839,247 A * | 6/1958 | Jorgensen | G05D 23/1346 236/12.11 |
| 4,016,901 A * | 4/1977 | Kenny | G05D 23/023 137/340 |
| 4,459,815 A | 7/1984 | Yokoyama | |
| 4,883,082 A | 11/1989 | Pirkle | |
| 2017/0167625 A1 * | 6/2017 | Dulin | F16K 31/002 |

FOREIGN PATENT DOCUMENTS

| | | |
|---|---|---|
| CN | 109340901 A | 2/2019 |
| EP | 0427736 A1 | 5/1991 |
| FR | 2754282 A1 | 4/1998 |
| WO | WO-2018207083 A1 * | 11/2018 |

* cited by examiner

*Primary Examiner* — Jonathan Bradford
(74) *Attorney, Agent, or Firm* — LAUBSCHER & FRETWELL, P.C.

(57) ABSTRACT

An antifreeze valve unit has a valve body provided with at least one opening for the delivery of a fluid used in an air conditioning plant; this unit has a first thermostatic valve, fitted at a drain outlet to drain the fluid in function of the fluid temperature, and a second thermostatic valve fitted at the drain outlet to enable or prevent the drain of the fluid in function of the external environment temperature. This antifreeze valve unit operates reliably in any temperature condition of the inner fluid and of the external environment temperature, and enables the plant to be drained only if a real possibility of fluid freezing occurs.

13 Claims, 9 Drawing Sheets

ANTIFREEZE VALVE UNIT

BACKGROUND OF THE INVENTION

The present invention relates to an antifreeze valve unit to be inserted into fluid circulation pipes intended for domestic or industrial air conditioning plants, in order to avoid freezing of the fluid and subsequent damage to the plant components.

PRIOR ART

Antifreeze valves are devices that are typically inserted into pipes in which a fluid circulates, for example water feeding domestic or industrial air conditioning plants, to prevent freezing thereof. The presence of these devices, in addition to avoiding possible damage to the pipes, linked to freezing of the fluid located in the inside thereof, enables damage to be avoided also to the components of the air conditioning plant.

Antifreeze valves are provided on the market that with a thermostat, usually a wax thermostat, wherein the wax varies the volume thereof in function of the operating fluid temperature and moves a drive piston. The thermostat, depending on whether it undergoes expansion or contraction, acts or does not act on a movable shutter. If the operating fluid temperature is near the freezing temperature thereof, the thermostatic element contracts so that the shutter takes on an open position that enables the plant to be drained of the operating fluid contained therein, so as to prevent the fluid freezing inside the pipes, generating the previously disclosed damage.

If the operating fluid is water, the antifreeze valve is calibrated so that the shutter drains the plant when the fluid temperature is near 0° C.

One drawback of antifreeze valves of known type is that they are calibrated by the manufacturers on the basis of the operating fluid freezing temperature for which they are designed, normally non-glycol water, and this calibration cannot be modified by the installer because safety devices do not permit modification thereof.

Another drawback of antifreeze valves of known type is that calibration is carried out exclusively on the basis of the operating fluid freezing temperature, without taking into account the temperature of the external environment, which can change significantly depending on the season.

A further drawback of antifreeze valves of known type is the possibility that the plants are drained unnecessarily during the summer months because it is very probably that, during the summer months with high external environment temperatures, fluid circulation at very low temperatures is required to cool the internal environments, causing the antifreeze valve to open although there is not probability of breakage of pipes in view of the high external temperatures and the fluid circulation.

OBJECTS OF THE INVENTION

The object of the present invention is to overcome the drawbacks mentioned above of the antifreeze valves currently used in domestic and industrial air conditioning plants.

SHORT DESCRIPTION OF THE INVENTION

Such objects are achieved by an antifreeze valve unit according to the first claim.

SHORT DESCRIPTION OF THE DRAWINGS

In order to better understand the invention, a non-limiting exemplary embodiment is described below, illustrated in the attached drawings wherein.

DETAILED DESCRIPTION OF THE INVENTION

Figure 1:
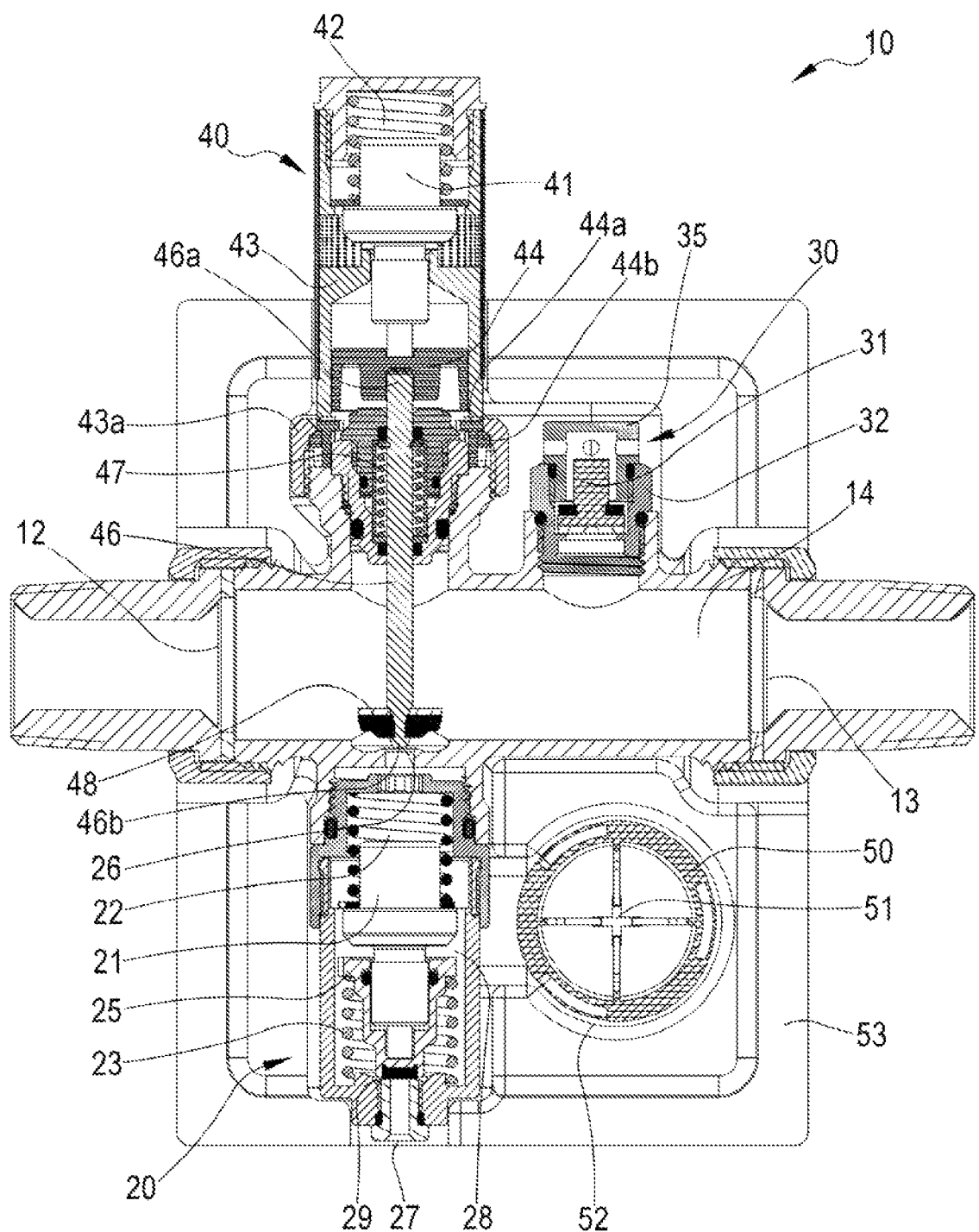
FIG. 1 is a front section view of an antifreeze valve unit according to the invention in a first operating configuration.
Figure 2:
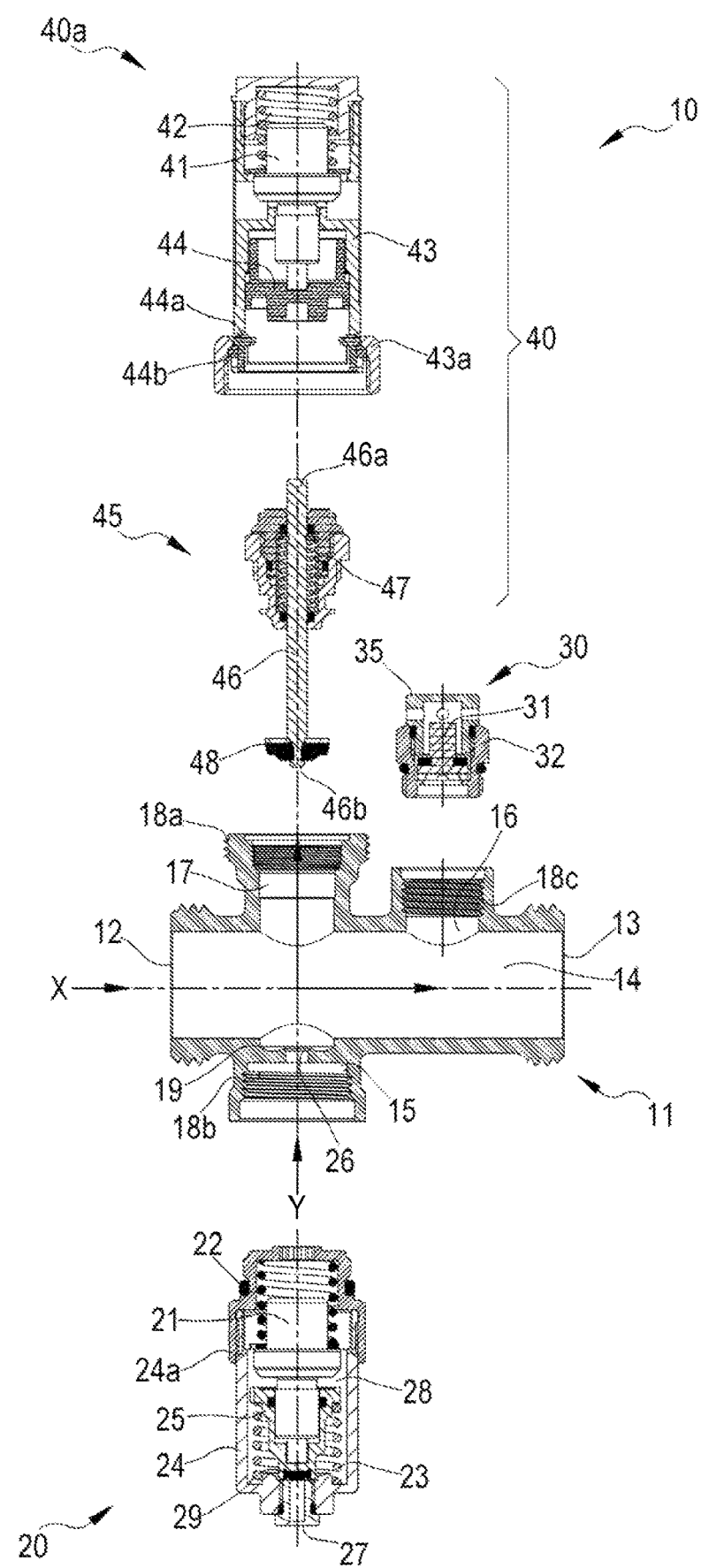
FIG. 2 is an exploded front section view of the antifreeze valve unit of FIG. 1.
Figure 3:
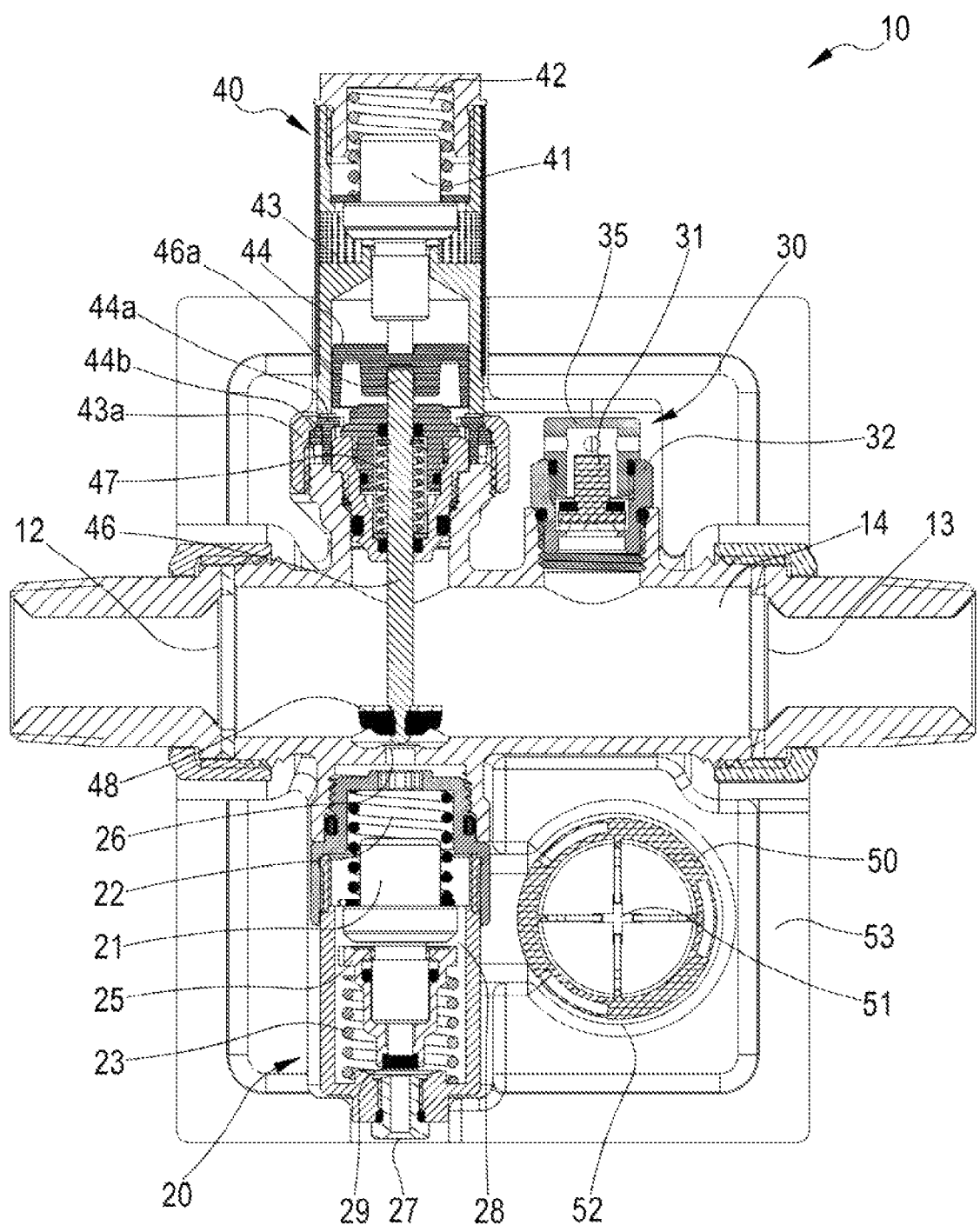
FIGS. 3,4,5 are front sections views of the antifreeze valve unit of FIG. 1 in other different operating configurations.
Figure 4:
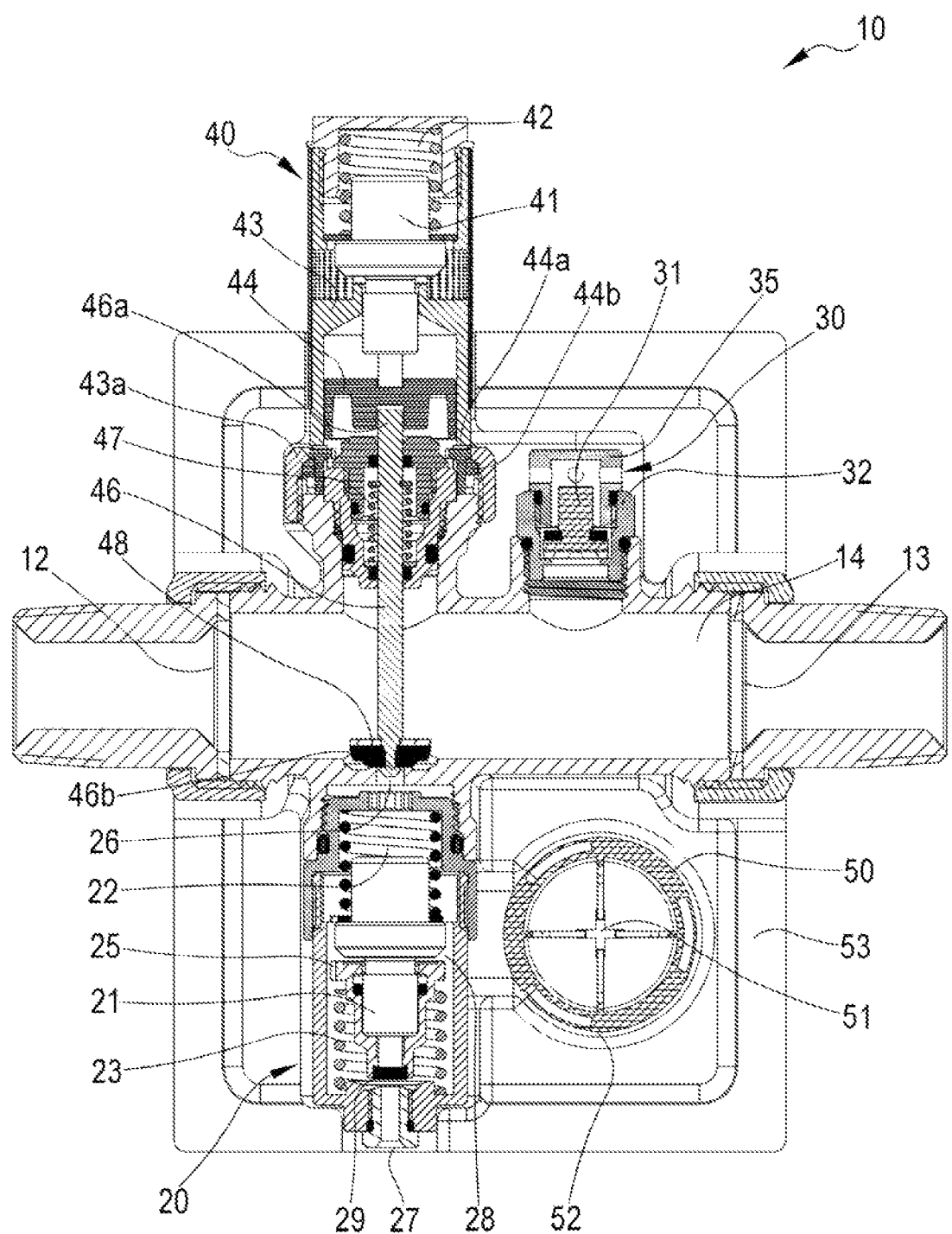
Figure 5:
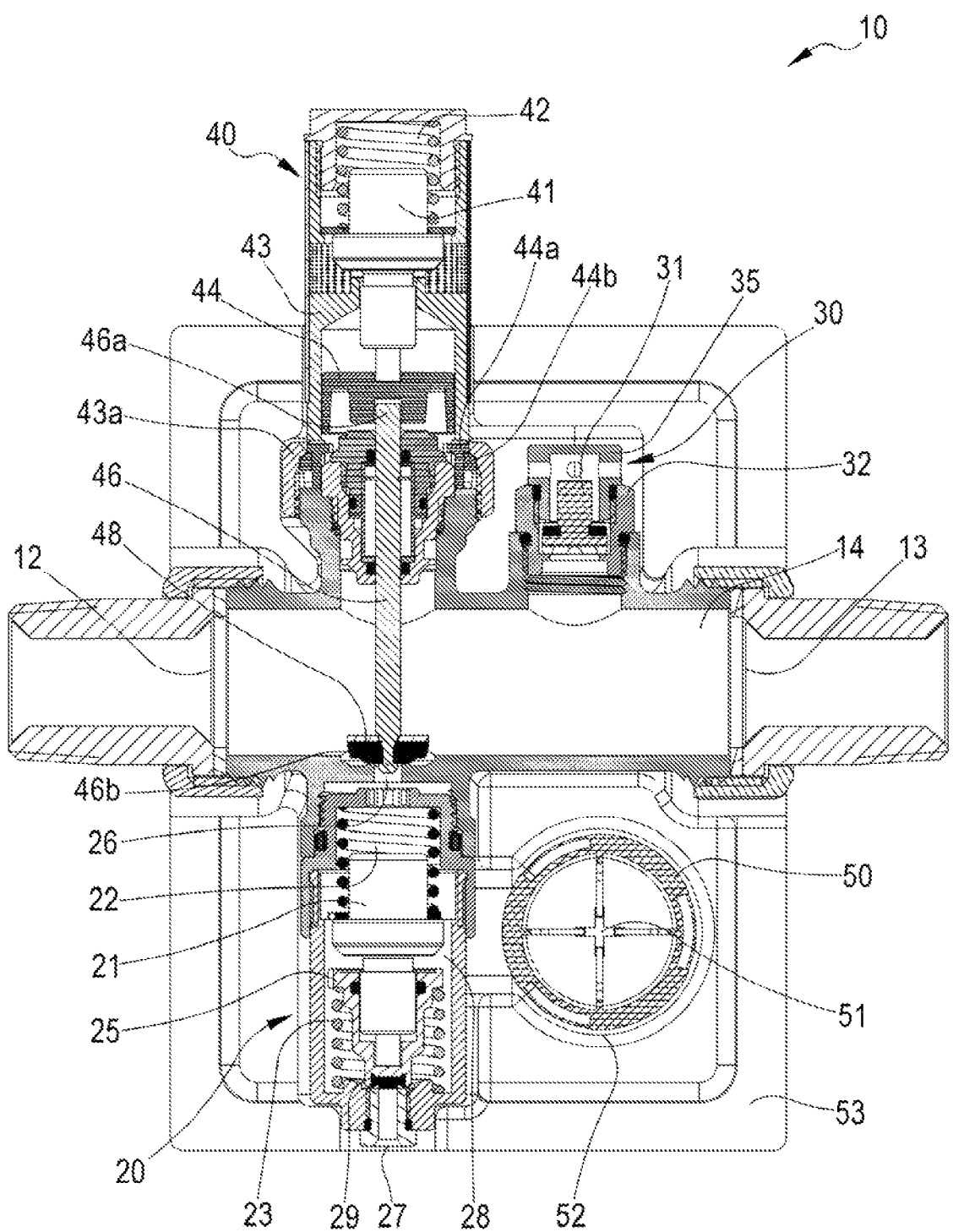

The antifreeze valve unit illustrated in FIG. 1 indicated overall with 10, is suitable for being installed in circulating pipes of a fluid intended for air conditioning plants.

The antifreeze valve unit 10 enables the plant to be drained of said fluid if temperature conditions occur so as to risk freezing of the fluid inside the pipes. This freezing could in fact cause breakage of the pipes themselves and/or damage to the components of the air conditioning plant.

In particular, said fluid can be water or another fluid typically used in domestic or industrial air conditioning plants. Depending on the operating fluid, the calibration temperatures of the antifreeze valve unit 10 can change, without however modifying the operating principles thereof. Further on in the present description, water will be considered to be the reference operating fluid.

The antifreeze valve unit 10 has a valve body 11 provided with two openings 12 and 13 for a water flow coming from an air conditioning plant. The two openings 12 and 13 are obtained in two ends of a conduit 14, suitable for the passage of the water inside the valve body 11.

This valve body 11, moreover, has three cavities, one cavity 15 in the lower part, and two cavities 16, 17 in the upper part, to house respectively a thermostatic valve 20 in contact with the water, a vacuum breaking device 30 and a thermostatic valve 40 in contact with the external environment. The thermostatic valve 20 in contact with the water and the thermostatic valve 40 in contact with the external environment are opposite with respect to a first geometric axis X of symmetry of the conduit 14, and coaxial with respect to a second geometric axis Y, orthogonal to the first geometric axis X.

The thermostatic valve 20 is fitted at a drain outlet 26 obtained in the valve body 11. Said drain outlet 26 places in fluid communication the conduit 14 of the valve body 11 with the thermostatic valve 20. In the lower end thereof, the thermostatic valve 20 provides an outlet 27 for the exit of the water from the air conditioning plant, if the risk of freezing due to the temperature conditions of the water and of the external environment arises. The thermostatic valve 20 is fitted, in particular, so as to adjust the opening or the closing of said outlet 27.

The thermostatic valve 20 in contact with the water includes a thermostat, immersed in said fluid and calibrated at a temperature near the freezing temperature thereof, for example at a temperature of 2° C. Said thermostat consists of a thermostatic wax element 21, kept in place by a first spiral spring 22. The lower part of the thermostatic wax element 21 is housed slidingly on a cap-shaped shutter device 25, on which a second spiral spring 23 acts. Said second spiral spring 23 maintains the shutter device 25 in normally open position (safety function). The cap-shaped shutter device 25 is movable along the geometric axis Y and provides, in the lower end thereof, a disc-shaped shutter 29. The thermostatic valve 20 is enclosed below by a cartridge body 24 and above by a cartridge cap 24a, which are screwed together. The cartridge cap 24a is in turn sealingly screwed to the valve body 11 by a threaded seat 18b, so that the thermostatic valve 20 occupies the cavity 15 obtained in the lower part of the valve body 11. The walls of the cartridge body 24 and the cartridge cap 24a of the thermostatic valve 20 define an inner chamber 28 in which the thermostatic wax element 21 is housed in direct contact with the water that circulates in the plant. The fact that the thermostatic wax element 21 is calibrated at a temperature of 2° C. means that said thermostatic element expands so as to close the outlet 27 when the liquid temperature is greater than the calibrating temperature. In particular, the opening or the closing of the outlet 27 is adjusted by the position of the shutter 29 with respect to the outlet 27.

The thermostatic valve 40 is fitted so as to adjust the opening or the closing of the drain outlet 26 that places in fluid communication the conduit 14 of the valve body 11 with the thermostatic valve 20 previously disclosed.

The thermostatic valve 40 in contact with the external environment includes an upper part 40a and a shutter device 45. The upper part 40a of the thermostatic valve 40 includes a thermostat, which is sensitive to the temperature of the external environment, calibrated on a temperature to be defined on the basis of the conditions and the position of the plant, for example included between 10° C. and 15° C. Said thermostat consists of a thermostatic wax element 41, kept in place by a spiral spring 42. The fact that the thermostatic wax element 41 is calibrated on a given temperature means that said thermostatic element expands so as to close the drain outlet 26 when the environment temperature is greater than this calibration temperature. The thermostatic valve 40 is enclosed above by a body 43 ending with a cover 43a which is screwed to the valve body 11, by a threaded seat 18a.

The shutter device 45 includes a rod 46, that extends along the direction of the geometric axis Y. An upper end 46a of the rod 46 can abut on a connecting element 44 made of thermoinsulating material, movable along the direction of the geometric axis Y, and connected by shape coupling to the lower end of the thermostatic wax element 41. There are also two thermoinsulating washers 44a and 44b. The connecting element 44 and the washers 44a and 44b made of thermoinsulating material have the purpose of thermally insulating the thermostatic wax element 41 from the fluid, so that the fluid temperature does not affect the operation of the thermostatic wax element 41, which has to be sensitive only to the temperature variations of the external environment. A spiral spring 47 acts on the shutter device 45, said spiral spring 47 maintains the shutter device 45 in normally open position (safety function). At a lower end 46b of the rod 46, a substantially conic shutter 48 is positioned, which can abut, when the thermostatic wax element 41 adopts the expanded configuration, on a recess 19 obtained in the valve body 11 at the cavity 15. The conic shutter 48, sealingly abutting on the recess 19, closes the drain outlet 26 that places in fluid communication the conduit 14 of the valve body 11 with the thermostatic valve 20. The shutter device 45 is configured for occupying the cavity 17 obtained in the upper part of the valve body 11 and a section portion of the passage conduit 14 of the fluid in the valve body 11.

The vacuum breaking device 30 includes a shutter 31 enclosed by a vacuum breaking body 32. The vacuum breaking device 30 is screwed to the valve body 11 at a threaded seat 18c, so as to occupy the cavity 16 obtained in the upper part of the valve body 11. The vacuum breaking body 32 is sealingly closed above by an adapter 35, being connected by shape coupling with said vacuum breaking body 32.

Figure 6:
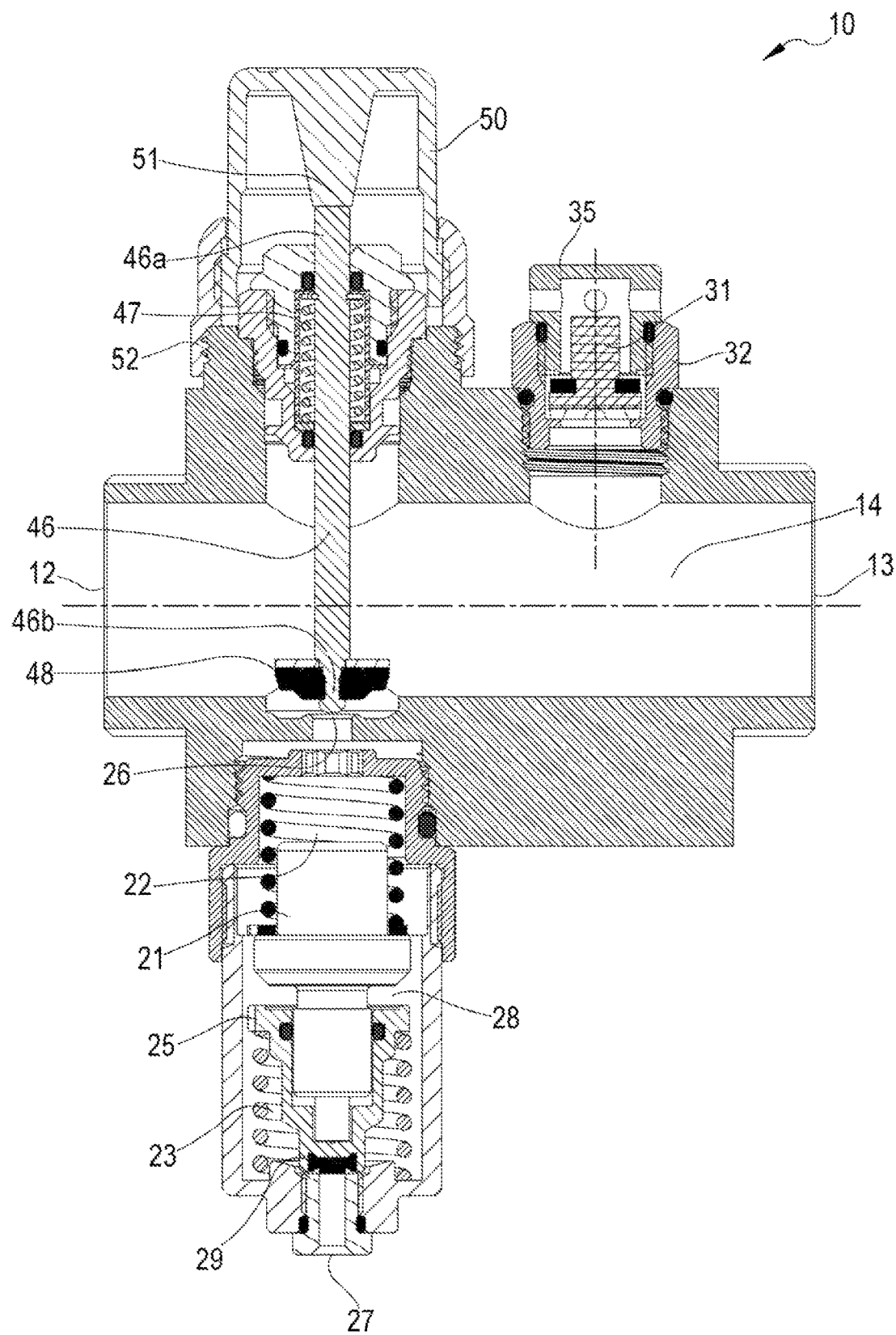
FIG. 6 is a front section view of the antifreeze valve unit of FIG. 1 in a maintenance configuration.
Figure 7:
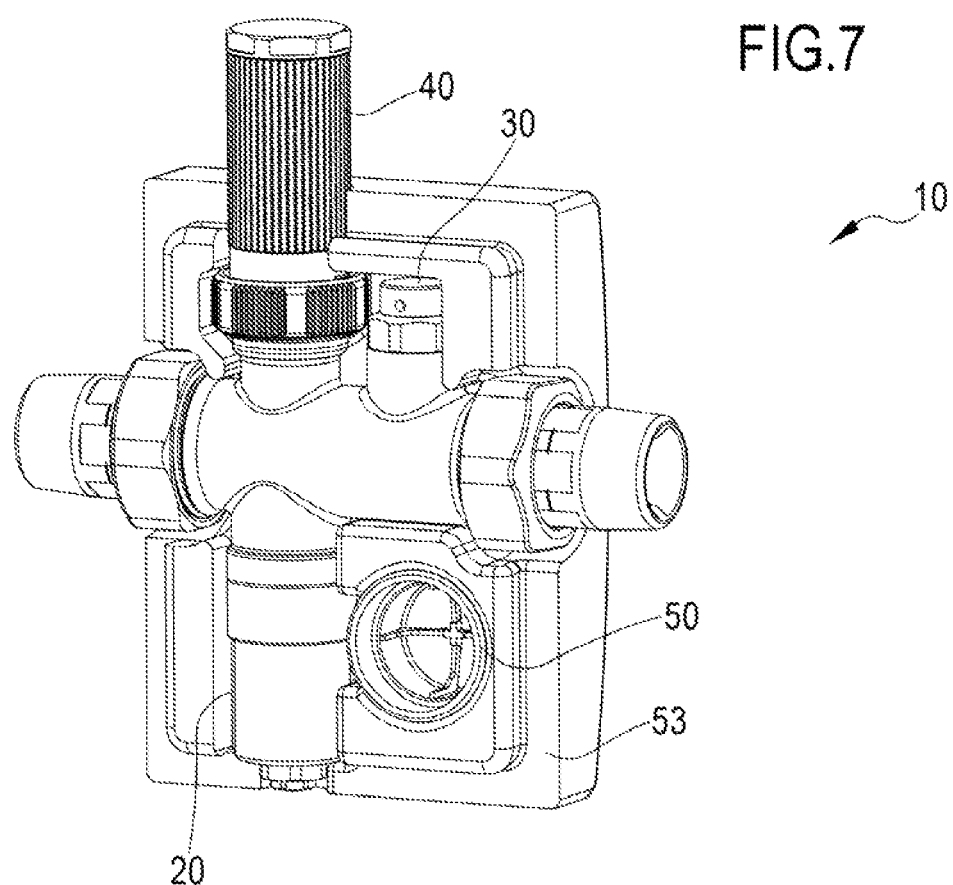
FIG. 7 shows a front view and a perspective view of the antifreeze valve unit of FIG. 1.
Figure 8:
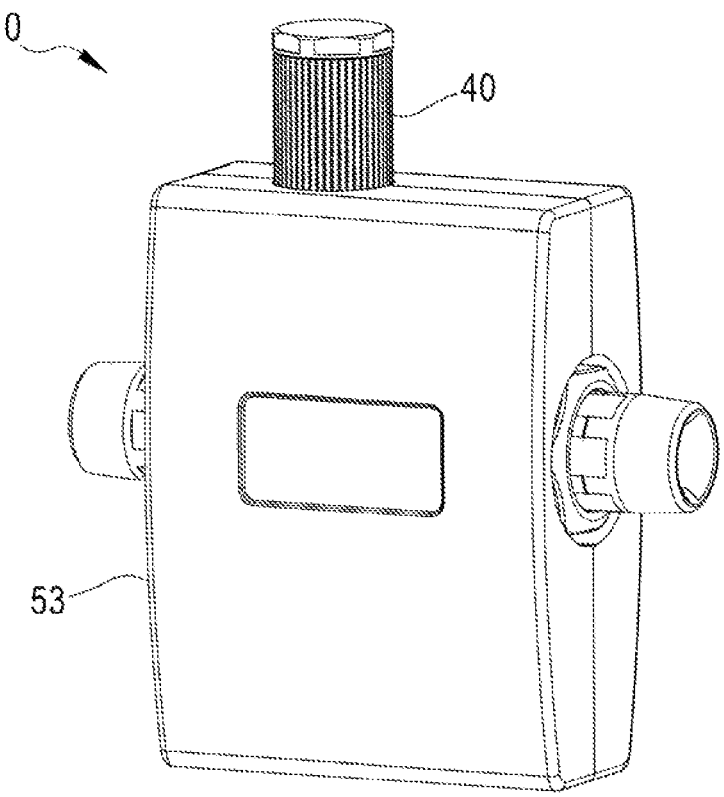
FIG. 8 shows a front view and a perspective view of the antifreeze valve unit of FIG. 7 in the external configuration thereof.

A knob 50, shown in FIG. 6, can be provided to replace the upper part 40a of the thermostatic valve 40 to abut on the rod 46 of the shutter device 45. In particular, the knob 50 is shaped with a central internal protrusion 51 suitable for abutting on the upper end 46a of the rod 46. The knob 50 is provided with threads to enable the knob 50 to be sealingly screwed into the threaded seat 18a of the valve body 11. Screwing the knob 50 into the threaded seat 18a of the valve body 11 imposes a downwards movement on the shutter device 45 until the outlet 26 is shut by the conic shutter 48.

When it is not used to replace the upper part 40a of the thermostatic valve 40, the knob 50 is stored in a housing 52 obtained in a box insulating shell 53 that encloses the antifreeze valve unit 10, as illustrated in any one of FIGS. 1,3,4,5.

With reference to the embodiment shown in FIGS. 1,3,4,5 four operating configurations of the antifreeze valve unit according to the invention will be disclosed in detail.

In order to better understand the different operating configurations, it is necessary to identify four different scenarios with four different conditions of temperature of the fluid contained in the air conditioning plant and of the external temperature, which vary significantly in function of the season.

The first scenario provides for using the air conditioning plant functioning in the winter season in which the external temperature can be below 0° C. but inside the plant the water circulates at temperatures above 20° C. for heating environments.

The second scenario provides for the conditioning plant, again in the winter season, being not working, in a situation wherein the external temperature can be below 0° C. but inside the plant the water is at low temperatures, even below 4° C.

The third scenario 3 provides for using the air conditioning plant operating in the summer season, wherein the external temperature can be greater than 20° C. but inside the plant the water circulates at low temperatures, even below 4° C., to cool the environments.

The fourth scenario provides for an air conditioning plant switched off in the summer season, wherein the external temperature can be greater than 20° C. but inside the plant no water circulates.

In the event of the first scenario, there is a condition wherein the temperature of the water that circulates in the plant is greater than 20° C., thus significantly far from freezing conditions, although the external temperature can be even lower than 0° C. As there is no need to drain the plant, the antifreeze valve unit 10 will be in the configuration shown in FIG. 1. According to this configuration, the thermostatic wax element 41 of the thermostatic valve 40 does not push the shutter device 45 to the closed position, the external temperature being lower than the calibration value of the thermostatic wax element 41. Accordingly, the outlet 26 is not engaged by the conic shutter 48 and remains open so that the water can flow down to the thermostatic valve 20. Simultaneously, the thermostatic wax element 21 of the thermostatic valve 20 pushes downwards the shutter device 25 so as to shut the outlet 27 with the disc shutter 29, the water temperature being greater than the calibration temperature of the thermostatic wax element 21, thus preventing the water from being drained from the plant.

In the case of the second scenario, there is a condition wherein the temperature of the still water inside the plant is lower than 4° C., because of lack of operation of the plant. Moreover, the external temperature can be less than 0° C., so a concrete risk of water freezing inside the plant may occur and it is necessary to drain the plant to prevent damage to the pipes and the components of the air conditioning plant. In this case, the antifreeze valve unit 10 will be then in the configuration shown in FIG. 3. According to this configuration, the thermostatic wax element 41 does not push the shutter device 45 to the closed position, the external temperature being lower than the calibration temperature of the thermostatic wax element 41. Accordingly, the outlet 26 is not engaged by the conic shutter 48 and remains open so that the water can flow down to the thermostatic valve 20. Simultaneously, the thermostatic wax element 21 does not push downwards the shutter device 25, leaving the outlet 27 of the thermostatic valve 20 open, the water temperature being lower than the calibration temperature of the thermostatic wax element 21, thus allowing the water to be drained from the plant.

In the case of the third scenario, there is a condition wherein the temperature of the water that circulates in the plant is lower than 4° C., so near the freezing temperature, but the external temperature is greater than 20° C. If the liquid temperature were exclusively considered, it could be thought that there may be a concrete risk of water freezing inside the plant, with the consequent need to drain the plant to avoid damage to the pipes and the plant components. In fact, the external temperature above 20° C. and the water circulation ensure that there is not a concrete risk of freezing, so it is not necessary to drain the plant. In this case the antifreeze valve unit 10 will be initially in the configuration shown in FIG. 4. According to this configuration, the thermostatic wax element 41 pushes the shutter device 45 to the closed position, the external temperature being above the calibration temperature of the thermostatic wax element 41. Accordingly, the outlet 26 is engaged by the conic shutter 48 and remains closed so that the water is not drained outside the plant. Simultaneously, the thermostatic wax element 21 is not immersed in the water and the shutter device 25 is in an open configuration owing to the safety function of the spiral spring 23. The outlet 27 of the thermostatic valve 20 thus remains open but water is not drained, the drain outlet 26 being closed upstream of the thermostatic valve 20.

In the case of the fourth scenario, lastly, there is a condition wherein the air conditioning plant is switched off, so the water is not circulating inside the pipes, and moreover the external temperature is above 20° C. In this case the antifreeze valve unit 10 will be in the configuration shown in FIG. 5. According to this configuration, the thermostatic wax element 41 pushes the shutter device 45 to the closed position, the external temperature being above the calibration temperature of the thermostatic element 41. Accordingly, the drain outlet 26 is engaged by the conic shutter 48 and remains closed so that the water is not drained outside the plant. Simultaneously, the thermostatic wax element 21 of the thermostatic valve 20, being immersed in water at a temperature above calibration temperature thereof, pushes downwards the shutter device 25 so as to shut the outlet 27 with the disc shutter 29.

It is possible that, after the start of a draining operation of the plant, a condition of pressure reduction inside the pipes is generated. This condition of pressure reduction prevents any water, possibly still contained inside the pipes, from being drained at the outlet 27, inasmuch as it is blocked by the air at greater pressure in the external environment. The vacuum breaking device 30, present in the antifreeze valve unit 10, enables the pressure to be balanced inside the pipes of the air conditioning plant, so as to completely drain the possibly remaining water from the plant.

In particular, when the drain outlet 26 is closed and the water circulates in the conduit 14, the shutter 31 inside the vacuum breaking device 30 remains lifted owing to the fluid pressure inside the plant. On the other hand, when the drain outlet 26 is open and the plant is being drained, to compensate for the decrease of the pressure inside the plant, the shutter 31 lowers and enables the air to enter from the outside through suitable internal passages. In this manner, the pressure inside the plant is re-established at the atmospheric pressure, and the water still contained inside the plant can be continued to be drained from the outlet 27 of the thermostatic valve 20.

If maintenance needs to be performed on the valve unit 10, it is possible to remove the thermostatic valve 40 in contact with the environment, the vacuum breaking device 30 and the thermostatic valve 20 in contact with the water by simply unscrewing said elements from the valve body 11. In particular, it is possible to maintain and/or replace the thermostatic valves 20 and 40 without the need to drain the water contained in the pipes from the plant. In fact, the upper part 40a of the thermostatic valve 40 can be temporarily replaced with the knob 50 to abut on the upper end 46a of the rod 46. On the rod 46 a downward movement is thus imposed along the geometric axis Y so that the conic shutter 48 engages the recess 19 of the valve body 11, closing the drain outlet 26 that places in fluid communication the conduit 14 with the thermostatic valve 20, so as to block the possibly draining of the water contained in the plant. Similarly, it is possible to maintain and/or replace the upper part 40a of the thermostatic valve 40 without the need to drain the water contained in the pipes from the plant. In fact, by unscrewing the upper part 40a of the thermostatic valve 40, the closing of the plant is guaranteed by the shutter device 45.

Figure 9:
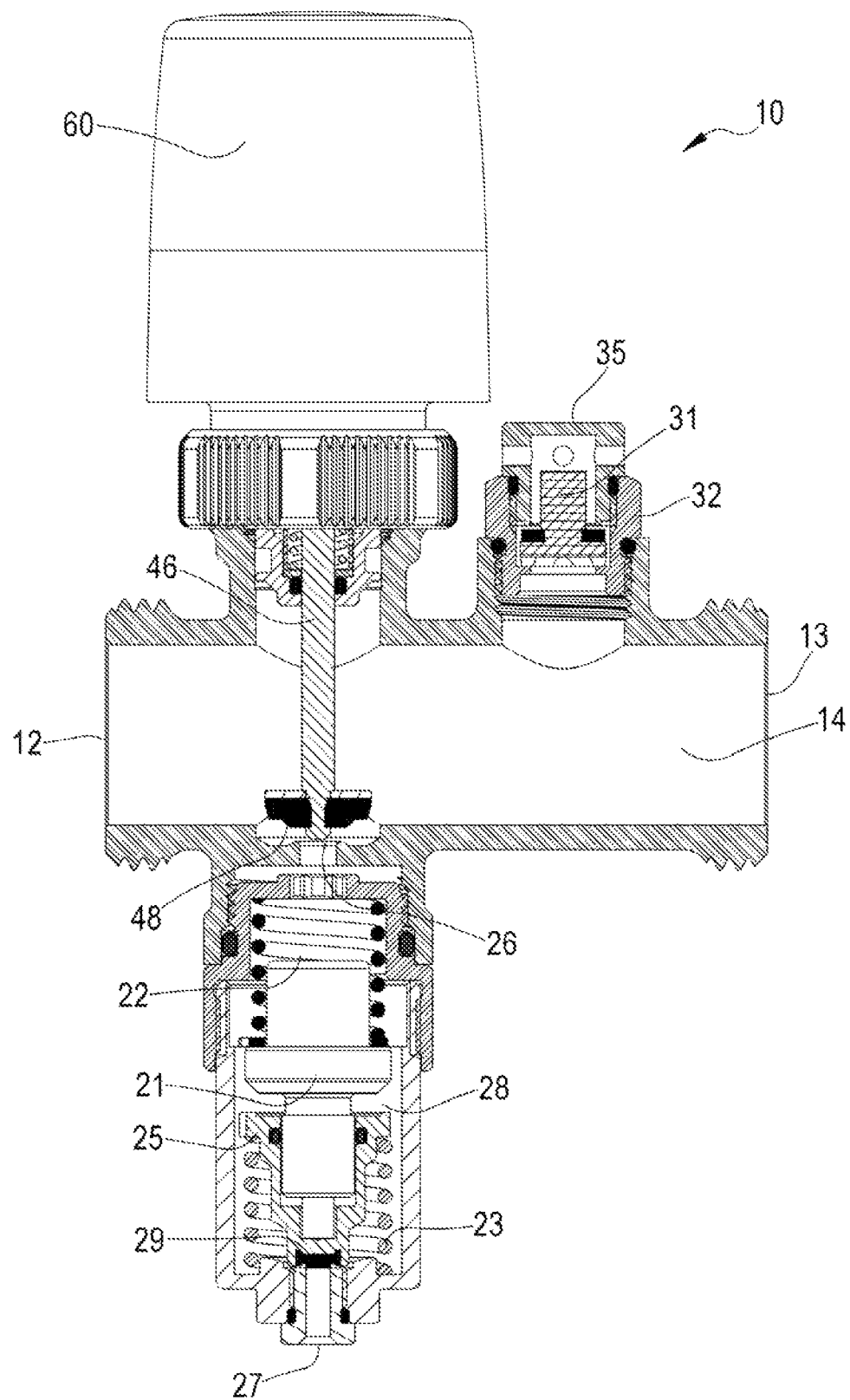
FIGS. 9,10 show variants of the antifreeze valve unit of FIG. 1.

In another embodiment shown in FIG. 9, it is possible to provide for a replacement of the thermostatic valve 40 of mechanical type with a device 60 of thermoelectric type, wherein the expansion of the thermostatic element occurs owing to reception of an electric signal, coming from a not shown external sensor, when the environment temperature detected by said sensor is greater than a set calibration temperature value.

Figure 10:
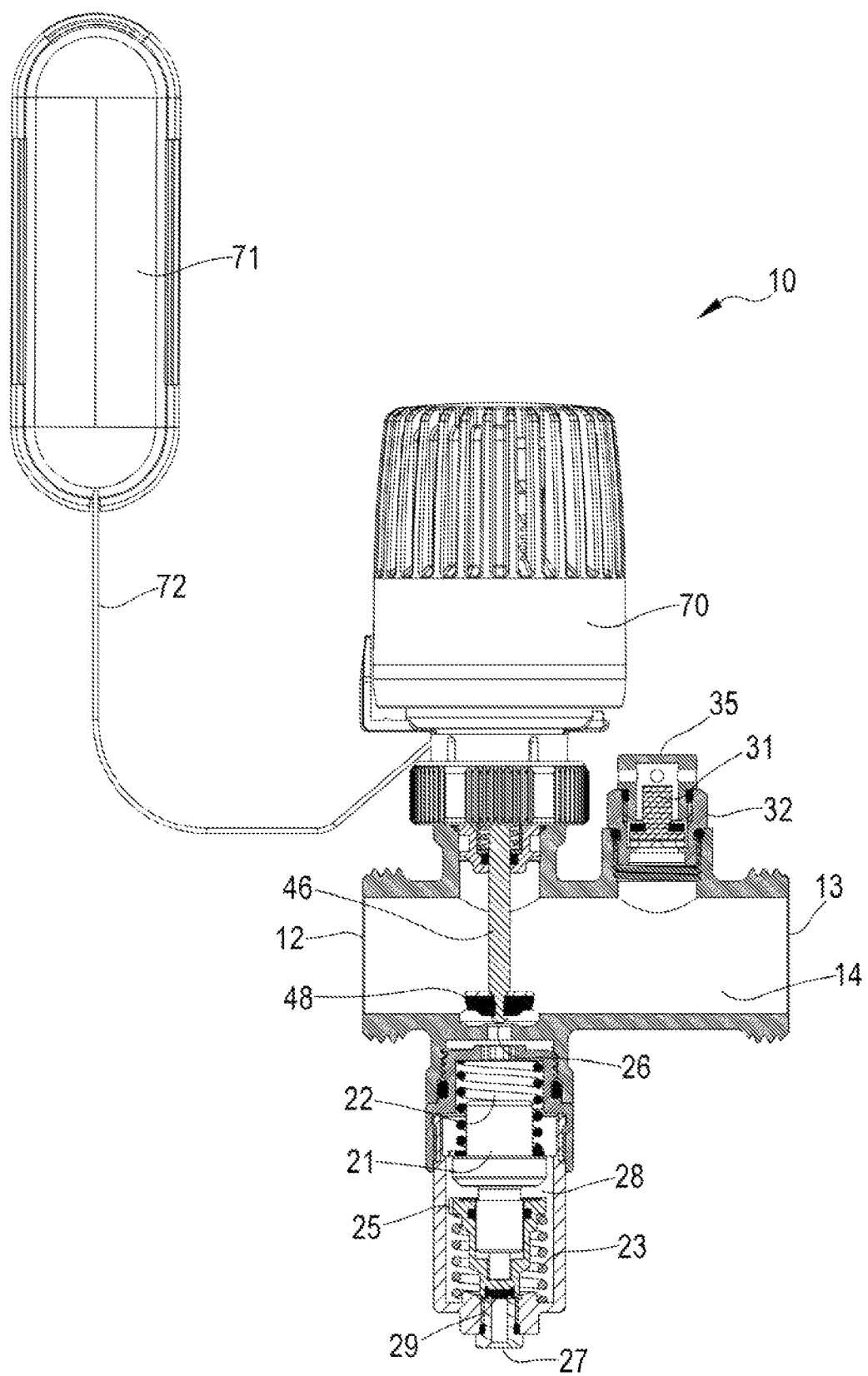

In a further embodiment shown in FIG. 10, it is possible to provide for a replacement of the thermostatic valve 40 with a valve 70 characterized by a remote thermostatic device 71. In this case, the remote thermostatic device is in fluid communication with the antifreeze valve unit by a small conduit 72 in which a heat sensitive material, for example wax, is located. Expansion or contraction of the heat sensitive material inside the thermostatic device, depending on whether the environment temperature is higher or lower than a set calibration temperature value, is transmitted to the upper shutter device of the antifreeze valve unit by said small conduit.

It is also possible to provide, in a not shown embodiment, for a replacement of the thermostatic valve 40 with an electronic device possibly controlled by an external logic system.

It is also possible to provide an antifreeze valve unit, in a further not shown embodiment, characterized by a sole opening for the delivery of the operating fluid by an air conditioning plant, possibly fitted in an end position in the plant.

A first advantage of the antifreeze valve unit 10 according to the invention is the use of a mechanical safety device that protects the pipes to which the air conditioning plant is connected from possible ice formation.

A second advantage of the antifreeze valve unit 10 according to the invention is the possibility of calibrating the device by taking into account both the temperature of the water that circulates in the pipes of the air conditioning plant, and the temperature of the external environment, which can change significantly according to the season.

Another advantage of the antifreeze valve unit 10 according to the invention is the possibility of avoiding draining unnecessarily the plant when a real possibility of freezing of the operating fluid does not occur.

A further advantage of the antifreeze valve unit 10 according to the invention is the possibility of protecting the air conditioning plant in any season, both hot and cold, without the need for an intervention by a technician or a user to switch operation between hot and cold seasons.

The invention claimed is:

1. An antifreeze valve unit for pipes connected to air conditioning plants, the valve unit including;
   a valve body provided with an inlet opening at one end for receiving an operating fluid from an air conditioning plant, an outlet opening at another end, and a conduit between said inlet and outlet openings for passage of the operating fluid within said valve body, said conduit containing a drain outlet;
   a first thermostatic valve connected with said valve body, at said drain outlet, said first thermostatic valve including a valve outlet and being operable to drain the operating fluid as a function of the temperature of the operating fluid; and
   a second thermostatic valve connected with said valve body coaxial with said first thermostatic valve, said second thermostatic valve including a shutter device operable to adjust opening and closing of said drain outlet to enable or prevent the drain of the operating fluid from said conduit into said first thermostatic valve as a function of the temperature of the external environment.

2. The antifreeze valve unit according to claim 1, wherein said first thermostatic valve includes a thermostatic wax element configured to expand and perform a closing of the value outlet if the fluid temperature is greater than a set calibration temperature value.

3. The antifreeze valve unit according to claim 1, wherein said second thermostatic valve contains a thermostatic wax element thermally insulated with respect to the operating fluid, and that is configured to expand and perform a closing of the drain outlet if the environment temperature is greater than a set calibration temperature value.

4. The antifreeze valve unit according to claim 2, wherein the thermostatic wax element of the first thermostatic valve is housed slidingly on a cap-shaped shutter device, which is held in a normally open position by a first spiral spring.

5. The antifreeze valve emit according to claim 3, wherein said shutter device is coupled with the thermostatic wax element by an intermediate connecting element made of thermo-insulating material, and held in a normally open position by a spiral spring.

6. The antifreeze valve unit according to claim 4, wherein said thermostatic wax element of the first thermostatic valve and said cap-shaped shutter device are movable along a direction defined by a geometric axis.

7. The antifreeze valve unit according to claim 5, wherein said thermostatic wax element of said second thermostatic valve and said shutter device are movable along a direction defined by a geometric axis.

8. The antifreeze valve unit according to claim 4, wherein the cap-shaped shutter device includes a disc-shaped shutter configured to sealingly abut on said drain outlet.

9. The antifreeze valve unit according to claim 5, wherein the shutter device includes a conic shutter that can sealingly abut on a recess located in the valve body at said drain outlet.

10. The antifreeze valve unit according to claim 1, wherein there is provided a vacuum breaking device fitted to the valve body to restore the balance between pressure inside the valve body and external pressure, in the event of a reduction of pressure in the conduit.

11. The antifreeze valve unit according to claim 5, wherein a knob is provided to replace a part of the second thermostatic valve which knob drives the shutter device of the second thermostatic valve to shut the drain outlet in order to perform replacement maintenance of the first thermostatic valve.

12. The antifreeze valve unit according to claim 11, wherein the knob is shaped with a central internal protrusion suitable for abutting on the shutter device and closing the drain outlet.

13. The antifreeze valve unit according to claim 11, wherein said knob is stored in a housing located in an insulating shell that encloses the antifreeze valve unit when it is not used to replace the part of the second thermostatic valve.

* * * * *